United States Patent [19]
Murakawa

[11] Patent Number: 5,161,642
[45] Date of Patent: Nov. 10, 1992

[54] OIL PAN CONSTRUCTION
[75] Inventor: Tomohiro Murakawa, Iwata, Japan
[73] Assignee: Yamaha Hatsudoki Kabushiki Kaisha, Shizuoka, Japan
[21] Appl. No.: 665,693
[22] Filed: Mar. 7, 1991
[51] Int. Cl.⁵ .............................................. F01M 11/00
[52] U.S. Cl. ................................. 184/6.5; 123/195 C; 123/195 S
[58] Field of Search ..................... 184/6.5, 106; 123/196 R, 195 C, 195 S

[56]  References Cited
U.S. PATENT DOCUMENTS

| | | | |
|---|---|---|---|
| 1,277,742 | 9/1918 | Mummert | 184/6.5 |
| 1,393,875 | 10/1921 | Woodworth | 184/6.5 |
| 1,759,147 | 5/1930 | Vincent | 184/6.5 |
| 2,341,488 | 2/1944 | Taylor | 123/195 S |
| 4,294,333 | 10/1981 | Little | 184/106 |
| 4,479,463 | 10/1984 | Curley et al. | 184/106 |
| 4,515,119 | 5/1985 | Hayashi et al. | 123/195 S |
| 4,848,293 | 7/1989 | Sasada et al. | 184/106 |
| 5,014,659 | 5/1991 | Ohshima et al. | 123/195 C |
| 5,016,584 | 5/1991 | Inoue et al. | 123/195 S |

Primary Examiner—Ira S. Lazarus
Assistant Examiner—Alan B. Cariaso
Attorney, Agent, or Firm—Ernest A. Beutler

[57] ABSTRACT

An oil pan construction for an internal combustion engine having a skirt portion defining a downwardly facing opening and a blanking plate that is affixed to the skirt portion by threaded fasteners which also affix the skirt portion to the cylinder block.

7 Claims, 4 Drawing Sheets

OIL PAN CONSTRUCTION

BACKGROUND OF THE INVENTION

This invention relates to an oil pan construction and more particularly to an improved oil pan construction for an internal combustion engine.

A wide variety of oil pan or crankcase constructions have been employed for internal combustion engines. One form of oil pan utilizes a steel stamping for the oil pan. Although such arrangements have the advantage of low cost, they add nothing to the structural rigidity of the engine and can present some problems with respect to noise transmission. In another type of oil pan construction, there is a skirt portion that is formed from a casting, frequently from a light weight alloy, that is bolted to the underside of the cylinder block. This skirt portion has a substantial downwardly facing opening across which a blanking plate is positioned. It has been normally the practice to bolt the skirt portion to the cylinder block with threaded fasteners and the blanking plate to the skirt portion with another set of threaded fasteners. This provides not only a complicated arrangement, but also requires the offsetting of the bolt circles so as to afford accessibility for all of the bolts. Also, with this type of arrangement, it is normally necessary to remove the blanking plate before the skirt portion can be removed. This is not always desirable.

It is, therefore, a principal object of this invention to provide an improved oil pan construction for an internal combustion engine.

It is a further object of this invention to provide an improved oil pan construction for an internal combustion engine that utilizes a cast skirt member and which can be easily affixed to the cylinder block along with the blanking plate.

SUMMARY OF THE INVENTION

This invention is adapted to be embodied in an oil pan construction for an internal combustion engine having a cylinder block defining the upper portion of a crankcase chamber. A skirt member is provided which encircles the crankcase chamber of the cylinder block and which has a downwardly facing opening. A blanking plate extends across this downwardly facing opening and is affixed together with the skirt portion to the cylinder block by means of a plurality of threaded fasteners.

DETAILED DESCRIPTION OF THE PREFERRED EMBODIMENT OF THE INVENTION

Figure 1:
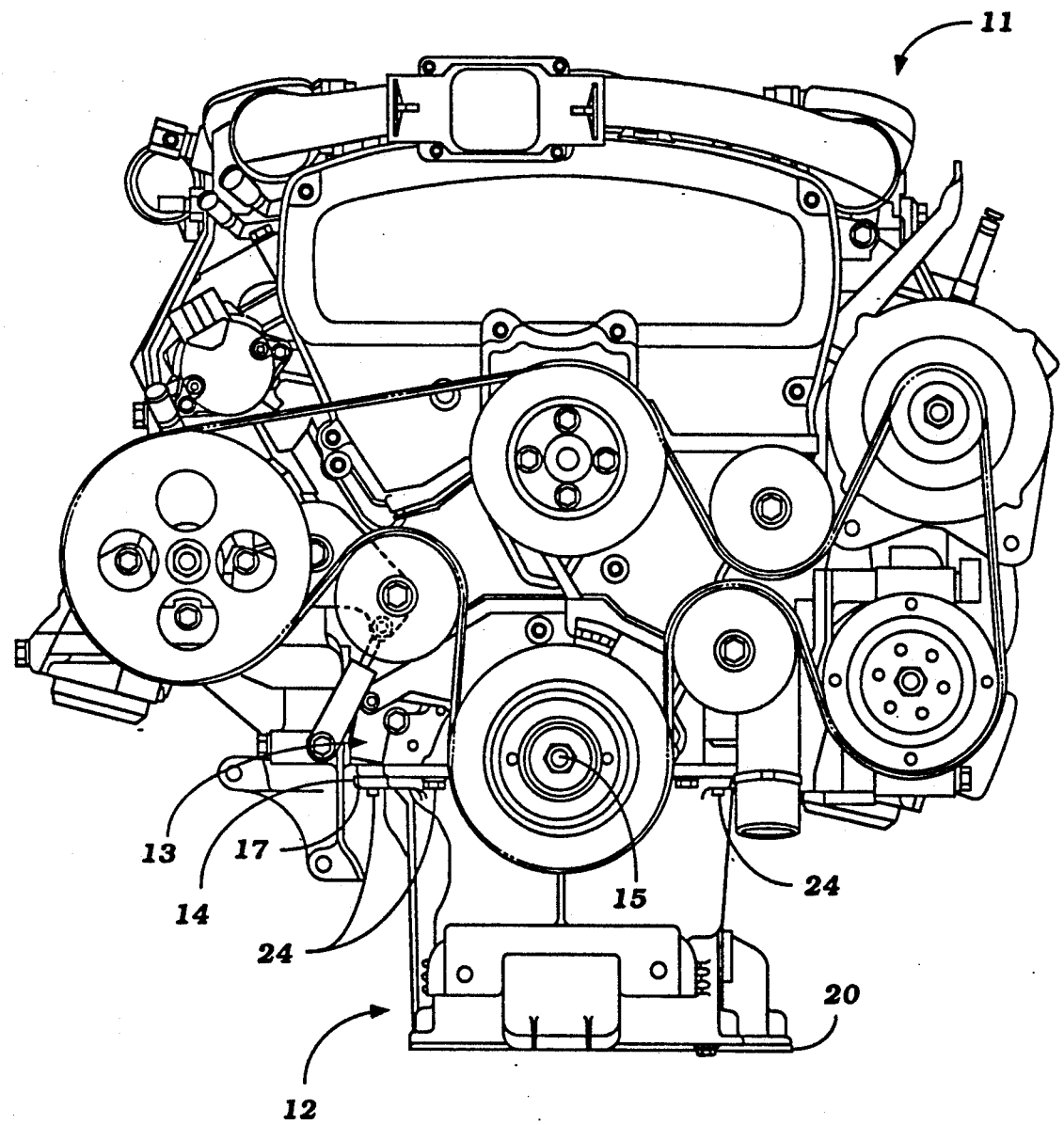
FIG. 1 is a front elevational view of an internal combustion engine having an oil pan constructed in accordance with an embodiment of the invention.

Referring in detail to the drawings, a V-6 type internal combustion engine is identified generally by the reference numeral 11. Although the invention is described in conjunction with an engine having a V-6 configuration, the invention may be utilized with other cylinder configurations and with other cylinder numbers. The invention, however, has particular utility in conjunction with V type engines.

The engine 11 includes an oil pan assembly, indicated generally by the reference numeral 12 and which is constructed in accordance with an embodiment of the invention. Since the invention deals primarily with the construction of the oil pan 12 and its method of attachment to the remainder of the engine, the detailed construction of the engine 11 per se is not necessary to understand the construction and operation of the invention. It is to be understood, however, that the engine 11 includes a cylinder block, indicated generally by the reference numeral 13 which has a downwardly facing flange 14 that surrounds the upper portion of the crankcase assembly in which the crankshaft 15 of the engine is journaled in a suitable manner.

Figure 2:
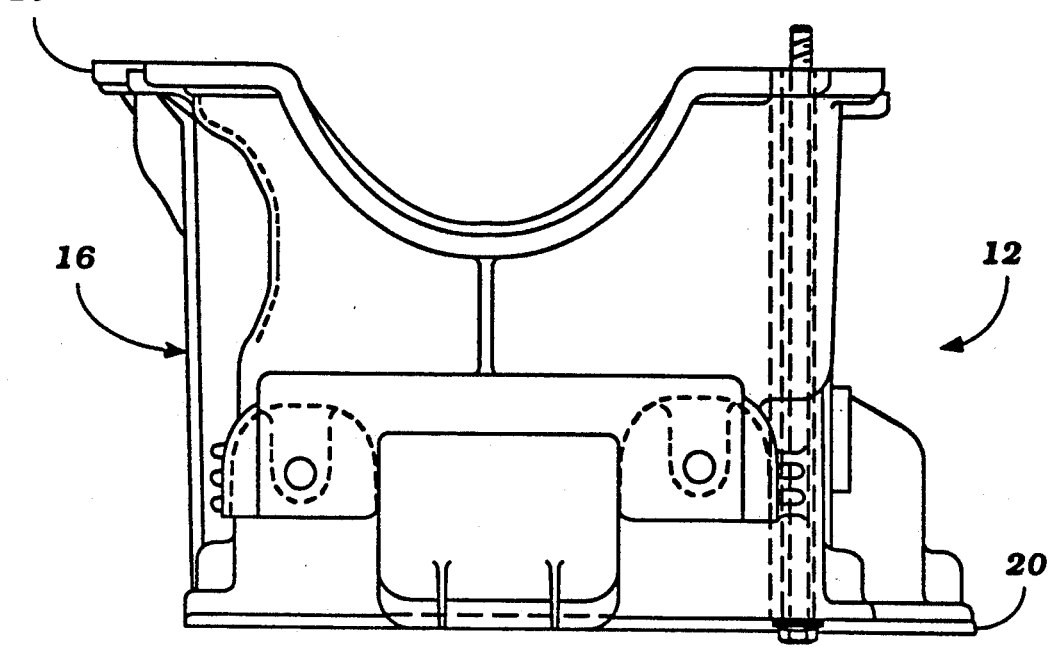
FIG. 2 is an enlarged front elevational view showing the oil pan assembly for the engine.
Figure 5:
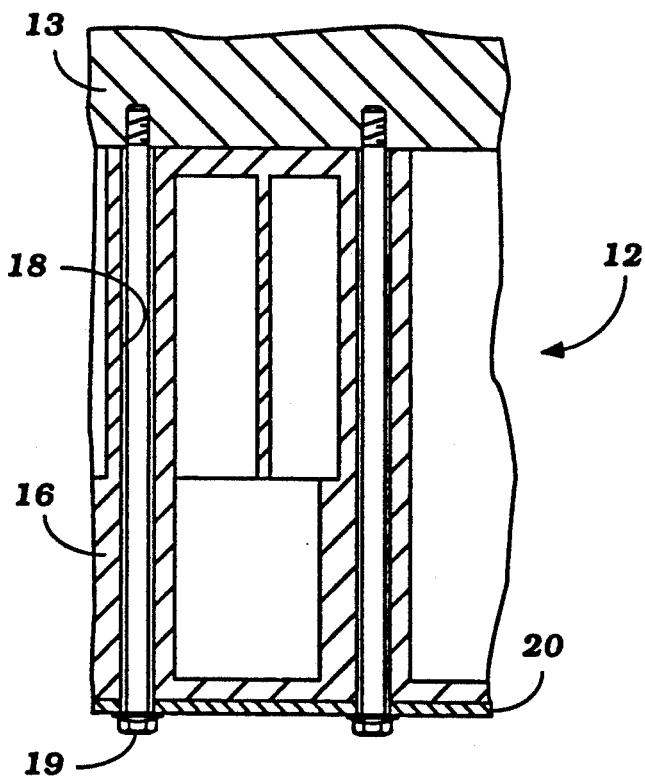
FIG. 5 is a cross sectional view taken along the line 5—5 of FIG. 4.
Figure 3:
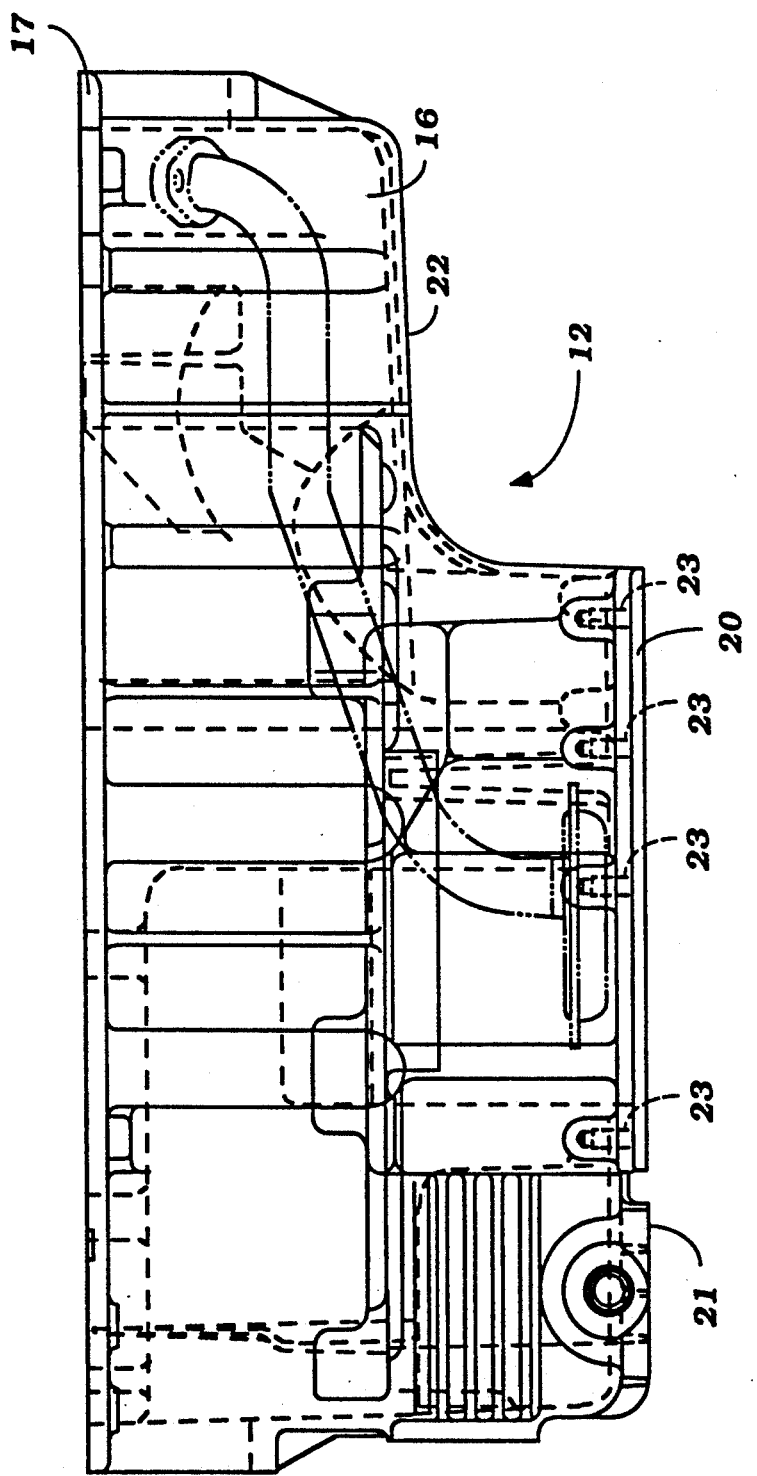
FIG. 3 is a side elevational view of the oil pan assembly.
Figure 4:
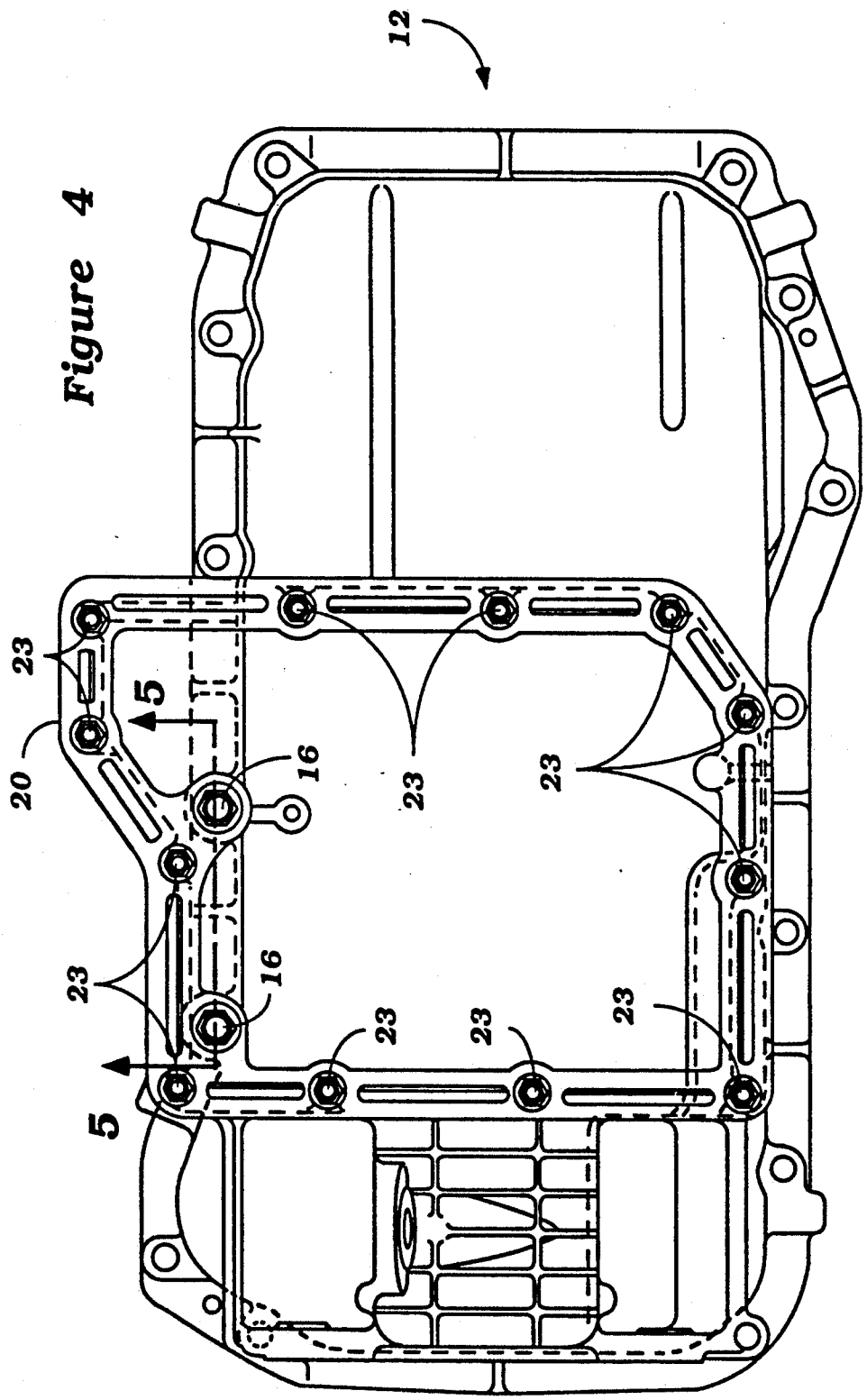
FIG. 4 is a bottom plan view of the oil pan assembly.

Referring now primarily to FIGS. 2 through 5, the oil pan assembly includes a main skirt portion, indicated generally by the reference numeral 16 which has an upwardly facing flange 17 which is complementary in shape to the cylinder block flange 14. This flange 17 is attached to the cylinder block flange 14 in a manner to be described and thus forms a closure for the crankcase.

The main skirt member 16 is preferably formed as a casting from a light alloy such as an aluminum alloy. The internal construction of the skirt portion 16 may be of any known configuration and since the invention deals primarily with the manner in which the skirt portion 16 is affixed to the cylinder block 13, further description of the skirt portion 16, except as to these features, is believed to be unnecessary.

The skirt portion 16 is formed with a partial lower wall but which defines a central opening that is closed by a blanking plate 20. The blanking plate 20 is formed from sheet steel or the like and may be made as a stamping. The skirt portion 16 is provided with a plurality of through bores 18 (FIG. 5) that are aligned with suitable openings in the blanking plate 20 and which pass either elongated bolts 19 or studs that are employed to affix not only the blanking plate 20 to the skirt portion 16, but also the skirt portion 16 and blanking plate 20 to the cylinder block 13. As a result, a single fastener may be employed for securing both members together. This can greatly simplify the assembly and also make it possible to remove the blanking plate 20 and skirt portion 16 together as a unit. With prior art constructions, as previously noted, it was necessary to remove the blanking plate before the skirt portion could be removed.

As has been noted the central opening of the partial lower wall of the skirt portion 16 is closed by the blanking plate 20. This partial opening is surrounded by a downwardly facing area 21 of the skirt portion 16. The downwardly facing portion 21 is disposed at the lower end of the skirt portion 16 and between this portion 21 and the flange 17 there is provided a further downwardly facing portion 22 which is substantially imperforate. Hence, the opening closed by the blanking plate 20 is substantially smaller than the total lower surface area of the skirt portion 16 as defined by the downwardly facing portions 21 and 22.

In addition to the long threaded fasteners 19 that secure both the blanking plate 20 and skirt portion 16 to the cylinder block, there may also be provided a second set of shorter threaded fasteners 23 that secure only the blanking plate 20 to the skirt portion 16 and a third set of threaded fasteners 24 away from the opening closed by the blanking plate 20 which fasten the skirt portion 16 to the cylinder block 13.

It is to be understood that the foregoing description is that of a preferred embodiment of the invention and that various changes and modifications may be made without departing from the spirit and scope of the invention, as defined by the appended claims.

I claim:

1. An oil pan assembly for an internal combustion engine having a cylinder block defining the upper portion of a crankcase chamber, a skirt portion defining the lower portion of the crankcase chamber and forming a downwardly facing opening in only a portion of the lower surface thereof, a blanking plate extending across said opening, a first plurality of threaded fasteners each affixing said blanking plate to said skirt portion and said skirt portion to said cylinder block, and a second plurality of threaded fasteners each affixing said blanking plate only to said skirt portion or removal of said blanking plate and said skirt portion as a unit from said crankcase chamber.

2. An oil pan assembly as set forth in claim 1 wherein the skirt portion is formed as a casting.

3. An oil pan assembly as set forth in claim 1 wherein the blanking plate is formed as a stamping.

4. An oil pan assembly as set forth in claim 3 wherein the skirt portion is formed as a casting.

5. An oil pan assembly as set forth in claim 1 further including a third plurality of threaded fasteners for affixing said skirt portion only to said cylinder block.

6. An oil pan assembly as set forth in claim 5 wherein the skirt portion has a first horizontally extending surface that is substantially imperforate and which is disposed at a different level from a second surface in which the downwardly facing opening is formed.

7. An oil pan assembly for an internal combustion engine having a cylinder block defining the upper portion of a crankcase chamber, a skirt portion defining the lower portion of said crankcase chamber and having downwardly extending side walls extending around the periphery of said crankcase chamber and from the cylinder block, said second lower wall portion being spaced further from said cylinder bock than said first lower wall portion and defining a downwardly facing opening therein, a blanking plate extending across said downwardly facing opening, and a plurality of threaded fasteners for affixing said blanking plate to said skirt portion and said skirt portion to said cylinder block, said threaded fastening means being disposed for permitting removal of said skirt portion and said blanking plate as a unit form said cylinder block without removal of said blanking plate from said skirt portion and also permitting removal of said blanking plate from said skirt portion without removal of said skirt portion from said cylinder block.

* * * * *

UNITED STATES PATENT AND TRADEMARK OFFICE
CERTIFICATE OF CORRECTION

PATENT NO. : 5,161,642

DATED : November 10, 1992

INVENTOR(S) : Tomohiro Murakawa

It is certified that error appears in the above-identified patent and that said Letters Patent is hereby corrected as shown below:

Column 3, line 21, Claim 1, "or" should be --for--.

Column 4, line 14, Claim 7, after "and" insert --first and second lower wall portions spaced different distances--.

Column 4, line 24, Claim 7, "form" should be --from--.

Signed and Sealed this

Ninth Day of November, 1993

Attest:

BRUCE LEHMAN

Attesting Officer

Commissioner of Patents and Trademarks